(12) United States Patent
Ho et al.

(10) Patent No.: US 7,828,431 B2
(45) Date of Patent: Nov. 9, 2010

(54) JUNCTIONLESS OPHTHALMIC LENSES AND METHODS FOR MAKING SAME

(75) Inventors: Arthur Ho, Clovelly NSW (AU); Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 143 days.

(21) Appl. No.: 11/421,225

(22) Filed: May 31, 2006

(65) Prior Publication Data

US 2006/0203189 A1 Sep. 14, 2006

Related U.S. Application Data

(63) Continuation of application No. 10/624,086, filed on Jul. 21, 2003, now Pat. No. 7,152,975, and a continuation-in-part of application No. 09/709,132, filed on Nov. 10, 2000, now Pat. No. 6,595,639.

(51) Int. Cl.
*G02C 7/04* (2006.01)
(52) U.S. Cl. .................... 351/160 H; 351/161
(58) Field of Classification Search ............. 351/160 H
See application file for complete search history.

(56) References Cited

U.S. PATENT DOCUMENTS

| | | | |
|---|---|---|---|
| 4,099,859 A | 7/1978 | Merrill et al. | |
| 4,401,372 A | 8/1983 | Mancini et al. | |
| 4,948,245 A | 8/1990 | Seger et al. | |
| 4,980,993 A | 1/1991 | Umezaki | |
| 5,020,898 A | 6/1991 | Townsley | |
| 5,260,000 A | 11/1993 | Nandu et al. | |
| 5,452,031 A | 9/1995 | Ducharme | |
| 5,532,768 A * | 7/1996 | Onogi et al. ............ 351/160 R |
| 5,570,142 A | 10/1996 | Leiberman | |
| 5,650,838 A | 7/1997 | Roffman et al. | |
| 5,798,816 A | 8/1998 | Martin et al. | |
| 5,815,236 A | 9/1998 | Vayntraub | |
| 5,815,237 A | 9/1998 | Vayntraub | |
| 5,835,187 A | 11/1998 | Martin | |
| 5,861,114 A | 1/1999 | Roffman et al. | |

(Continued)

FOREIGN PATENT DOCUMENTS

EP 0 742 462 A 11/1996

(Continued)

OTHER PUBLICATIONS

Cline et al., Rocky Mountain J. Math. 14(1), 119-139, 1984.

(Continued)

*Primary Examiner*—Jordan M. Schwartz
(74) *Attorney, Agent, or Firm*—Stout, Uxa, Buyan & Mullins; Frank J. Uxa; Greg S. Hollrigel

(57) ABSTRACT

Methods for producing a junctionless ophthalmic lens are provided. Additionally, ophthalmic lenses having junctionless, three dimensional surfaces, for example, asymmetrical anterior and/or posterior surfaces, as well as molding tools used in the production of such lenses, are also provided. The method generally include providing sample data points to define a surface contour, and interpolating between these data points using an algorithm to produce a simulated three dimensional surface. The simulated three dimensional surface is used in producing an ophthalmic lens, for example, in cast molding a contact lens.

34 Claims, 7 Drawing Sheets

U.S. PATENT DOCUMENTS

| | | | |
|---|---|---|---|
| 5,872,613 | A | 2/1999 | Blum et al. |
| 5,880,809 | A | 3/1999 | Lieberman et al. |
| 5,953,098 | A | 9/1999 | Lieberman et al. |
| 5,975,694 | A | 11/1999 | Vayntraub |
| 5,998,498 | A | 12/1999 | Vanderlaan et al. |
| 6,012,813 | A | 1/2000 | Qi |
| 6,086,204 | A | 7/2000 | Magnante |
| 6,089,710 | A | 7/2000 | Zeidler |
| 6,095,651 | A | 8/2000 | Williams et al. |
| 6,241,355 | B1 | 6/2001 | Barsky |
| 6,305,661 | B1 | 10/2001 | Kennedy |
| 6,419,359 | B2 | 7/2002 | Edwards |
| 6,467,903 | B1 | 10/2002 | Back |
| 6,499,843 | B1 | 12/2002 | Cox et al. |
| 6,554,425 | B1 | 4/2003 | Roffman et al. |
| 6,585,375 | B2 | 7/2003 | Donitzky et al. |
| 6,595,639 | B1 | 7/2003 | Ho et al. |
| 6,659,607 | B2 | 12/2003 | Miyamura et al. |
| 6,921,802 | B2 * | 7/2005 | Kunzler et al. ............... 528/32 |
| 7,152,975 | B2 * | 12/2006 | Ho et al. ............... 351/160 H |
| 2001/0033361 | A1 | 10/2001 | Edwards |
| 2002/0056801 | A1 | 5/2002 | Dean |
| 2003/0107703 | A1 | 6/2003 | Cox et al. |
| 2004/0039077 | A1 | 2/2004 | Baba et al. |
| 2004/0156013 | A1 * | 8/2004 | Lindacher et al. ....... 351/160 R |
| 2004/0233382 | A1 * | 11/2004 | Lindacher et al. ....... 351/160 R |
| 2004/0246440 | A1 * | 12/2004 | Andino et al. ............... 351/177 |
| 2005/0070942 | A1 * | 3/2005 | Perez ....................... 606/166 |
| 2006/0001184 | A1 | 1/2006 | Phelan et al. |
| 2008/0095753 | A1 * | 4/2008 | Pakola et al. ............... 424/94.6 |

FOREIGN PATENT DOCUMENTS

| | | |
|---|---|---|
| GB | 2 327 283 A | 1/1999 |
| JP | 2000-198126 | 7/2000 |
| KR | 2000-34800 | 6/2000 |
| KR | 2002-87944 | 11/2002 |
| KR | 2003-45176 | 6/2003 |
| WO | WO 01/75509 | 10/2001 |
| WO | WO 02/071130 | 9/2002 |
| WO | WO 02/088830 | 11/2002 |

OTHER PUBLICATIONS

Renka et al., ACM Trans. Math. Software 10(4), 440-442, 1984.
Renka et al., Rocky Mountain J. Math. 14(1), 223-237, 1984.
Jones, Manufacturing 3-Dimensional Contact Lenses, Global Contact, 1998.
Atkin et al., Lens Ant. Eye 2000; 23: 168, 2000.
Office Action dated Mar. 7, 2002, U.S. Appl. No. 09/709,132, filed Nov. 10, 2000.
Office Action dated Jun. 25, 2002, U.S. Appl. No. 09/709,132, filed Nov. 10, 2000.
Office Action dated Dec. 14, 2004, U.S. Appl. No. 10/624,086, filed Jul. 21, 2003.
Office Action dated Jun. 20, 2005, U.S. Appl. No. 10/624,086, filed Jul. 21, 2003.
Office Action dated Mar. 1, 2006, U.S. Appl. No. 10/624,086, filed Jul. 21, 2003.

* cited by examiner

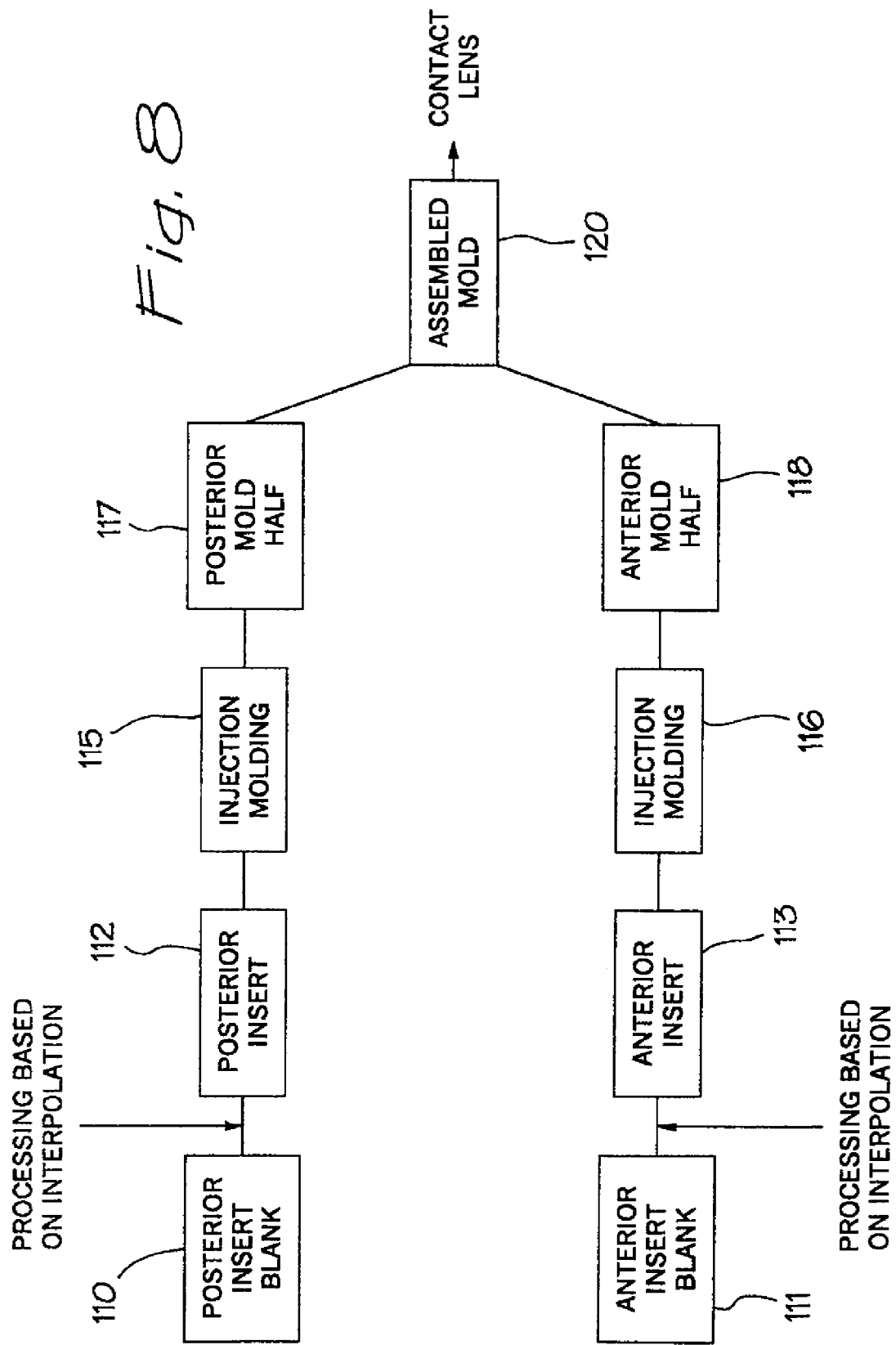

JUNCTIONLESS OPHTHALMIC LENSES AND METHODS FOR MAKING SAME

CROSS-REFERENCE TO RELATED APPLICATIONS

This application is a continuation of application Ser. No. 10/624,086, filed Jul. 21, 2003, which is a continuation-in-part of application Ser. No. 09/709,132, filed Nov. 10, 2000, the disclosure of each of which in its entirety is hereby incorporated by reference.

The present invention generally relates to ophthalmic lens design and more specifically relates to junctionless ophthalmic lenses and methods for manufacturing ophthalmic lenses having junctionless, three dimensional surfaces.

Contact lens design typically involves a number of steps. The back surface, i.e. posterior surface, of the lens is frequently designed first based on the shape of the cornea and a desired cornea-lens fitting relationship. The front surface, i.e. anterior surface, of the lens is constructed to obtain the necessary refractive correction for the eye and the desired lens performance. Such performance depends on a number of factors, including, but not limited to, lens mass distribution to provide effective eyelid interaction to achieve desired lens movement and lens position, other configurational considerations to provide for the comfort of the lens wearer and the like.

It is known that the surface topographies of a normal human cornea are often not spherical. For example, it is well known that the corneal surface of an eye has a curve that generally flattens from the center of the cornea to the periphery. A typical approach to create a flatter peripheral lens surface and adequate edge clearance between the edge of the lens and the underlying cornea/conjunctiva, has been to generate a series of conic section curves, each having a radius of curvature larger (i.e. flatter) than the preceding one. Both the anterior and posterior surfaces of conventional contact lens designs have been described in two dimensions by a series of rotationally symmetric surface segments. The surface segments may or may not be offset from the axis of symmetry.

Conventionally designed lenses have been therefor described in two dimensions, such as by a series of rotationally symmetric surface segments, and may be mathematically described thereby. The mathematical descriptions of two dimensional surface sections are made smooth and continuous by compositing, for example, splines or polynomials or blending of the sections. Such smooth, continuous surfaces can be considered to be free of junctions, or junctionless. Thus, ophthalmic lens surfaces with junctions have segments which intersect at discontinuities which can cause discomfort and/or one or more other reductions in lens performance. Thus, it is advantageous to provide an ophthalmic lens with one or more substantially junctionless surfaces.

Ducharme U.S. Pat. No. 5,452,031, which is incorporated in its entirety herein by reference, discloses a contact lens and method for manufacturing a contact lens having a smooth, junctionless surface. More specifically, the Ducharme patent discloses a method for defining the shape of the contact lens surface by relating the corneal surface to a reference curve. The reference curve may be derived from the use of piecewise polynomials and splines, based on point coordinates, resulting in a junctionless surface topography. A computer controlled lathe receives the spline data and generates a signal indicating the necessary lens form to be cut.

Vayntraub U.S. Pat. No. 5,815,237 which is incorporated in its entirety herein by reference, discloses a method for making a contact lens having a peripheral zone surface defined by an exponential function. Similarly, Vayntraub U.S. Pat. No. 5,815,236 and also incorporated in its entirety herein by reference, discloses a method for making a contact lens having a peripheral zone surface defined by a logarithmic function.

Although more closely approximating the curvature of a human eye than earlier spherically based contact lens forms, these now conventional lens computer aided design methods, which are based on using polynomial and spline based interpolations, or exponential and logarithmic mathematical functions, result in a lens constrained to a two dimensional description of the surface topography.

The surface topography of a normal human cornea is often unique and includes areas of irregularity, asymmetry and asphericity that can not adequately be described in two dimensions. Likewise the lens anterior or posterior lens surface shape required to achieve optimal lens performance cannot be adequately described in two dimensions. Particularly in such cases, conventional two dimensional computer aided lens design methods are insufficient.

Designing a lens in two dimensions is inadequate when one or more of the posterior or anterior surfaces involves an asymmetric component, that is a rotationally asymmetric component. Although computer controlled manufacturing techniques have facilitated manufacture of lenses in recent years, such techniques in practice have had only limited application and are inadequate in design and production of lenses having one or more asymmetric components, particularly lenses for use in or on an eye, such as contact lenses, intraocular lenses and corneal onlay lenses. This is because current art in lens design necessarily requires assumptions and compromises to the design by the averaging and compositing of many two dimensional surfaces. Such assumptions and compromises can result in reduced lens performance, both optically and based on user comfort.

It would be advantageous to provide new ophthalmic lenses and methods of designing and producing ophthalmic lenses which address one or more of the concerns with prior lenses, lens designs and production methods.

SUMMARY OF THE INVENTION

New ophthalmic lenses and methods for ophthalmic lens design and manufacture have been discovered. The present lenses and methods offer significant advantages over conventional lenses and methods by providing ophthalmic lenses having substantially smooth, junctionless, three dimensional surfaces which may include one or more rotationally asymmetric components. Lenses produced by the methods in accordance with the invention may include, but are not limited to, ophthalmic lenses structured and adapted for use in or on an eye, for example, all types of contact lenses, such as toric contact lenses, monofocal and multifocal contact lenses and the like, intraocular lenses (IOLs), such as anterior chamber IOLs, posterior chamber IOLs and the like, corneal onlay lenses, such as lenses affixed on the cornea, lenses placed or affixed in the cornea and the like. In addition, methods of the present invention may be utilized during corneal refractive laser surgery, for example in the shaping of the cornea.

The present invention provides methods for designing and manufacturing ophthalmic lenses having one or more substantially smooth, junctionless, three dimensional surfaces, for example, wherein the surface or surfaces may have one or more asymmetrical components. The scope of the present invention also includes such lenses, tooling inserts and mold sections used to manufacture such lenses, and methods of producing such tooling inserts and mold sections.

Advantageously, the present invention provides one or more additional, for example, relative to the prior art, degrees of freedom to control lens shape, surface contour, distribution of mass, optical power location and the like parameters within the lens design. Consequently, enhanced ophthalmic lens performance, for example, related to comfort, fitting, vision and/or lens positioning are provided by the present invention.

It will be appreciated that the present methods are especially advantageous when applied to lens design where constraints of symmetry would otherwise present a disadvantage. For example, the methods are very well suited for the design of toric contact lenses, for example a toric contact lens including a posterior toric optical zone and an anterior surface shaped to provide the lens with appropriate optical power and a thickness profile facilitating lens orientation and stabilization in the form of a ballast.

Moreover, the present invention provides for enhanced reproducibility of the ophthalmic lens dimensions and surfaces. The present invention very effectively complements modern CNC lathes which have been used to produce ophthalmic lenses.

In one broad aspect of the present invention, methods for producing ophthalmic lenses are provided which generally comprise providing or specifying selected sample data points from a designated surface, for example, a designated corneal surface (the surface of the cornea of the wearer of the lens) or designated or desired anterior lens surface, interpolating between the sample data points using at least one algorithm to define a simulated three dimensional designated surface, preferably that has a relationship to, for example, is based at least in part on, the designated surface, and forming an ophthalmic lens having the simulated three dimensional designated surface.

The simulated design surface preferably is sufficiently well defined, for example, in the interpolating step, to be a smooth, substantially junctionless three dimensional surface. In one embodiment, the simulated three dimensional surface is defined, during the interpolating step, using the sample data points and one or more factors or relationships for one or more lens design parameters. Advantageously, the forming step is conducted so that the ophthalmic lens has the desired lens design parameters including, but not limited to, the desired optical correction or corrections, size, configuration, space or gap between the cornea and posterior surface of the lens and other desired optical fitting relationships and the like.

Advantageously, the methods of the present invention can be used to produce contact lenses having surfaces not constrained to contours defined by a two dimensional surface of rotation. Rather, the present lenses preferably are defined by one or more smooth, substantially junctionless, three dimensional surfaces, including any rotationally asymmetric components unique or customized to the wearer's eye. This results in an improved lens/cornea fitting relationship and/or anterior surface shape that achieve desired physical, physiological lens movement and/or vision correction objectives.

In one aspect of the invention, ophthalmic lenses are provided and comprise lens bodies, preferably structured and adapted to be located in or on an eye, having anterior surfaces and generally opposing posterior surfaces. At least one of the anterior surface and the posterior surface is a substantially smooth, junctionless, three dimensional surface. The junctionless surface may be an asymmetrical surface. In certain embodiments, the ophthalmic lens has a varied anterior surface topography defining a ballast. Such a varied anterior surface topography may, and preferably does, facilitate at least one of lens comfort, lens orientation, vertical lens translation, and/or lens stabilization when the lens is located on a corneal surface. In addition, the lenses may have a lens body with at least one contour that defines a substantially junctionless varying radial thickness. Such ophthalmic lenses may include hydrophilic silicone polymer components, and in particular embodiments, the ophthalmic lenses include silicone hydrogels. In situations where the ophthalmic lens is used to provide vision correction for an astigmatism, the lens may, and preferably does, include a toric surface, such as a toric posterior surface. In situations where more than one optical power is necessary to provide a desired vision correction, the lens may, and preferably does, include a multi-powered optical zone. In other words, the lens may include a multi-focal optical zone (e.g., an optical zone having two or more optical powers). Accordingly, multi-focal lenses may include bifocal lenses, trifocal lenses, and the like.

In another aspect of the present invention, a contact lens is provided which includes a lens body containing a hydrophilic silicone polymer component, such as a silicone hydrogel and the like. The lens body may be shaped or formed in accordance with the methods disclosed herein. These contact lenses may include a toric surface, such as for providing vision correction to astigmatic eyes, and may include a varied surface topography with at least one contour that defines a substantially junctionless varying radial thickness, and facilitates at least one of lens comfort, lens orientation, vertical lens translation, and/or lens stabilization when the contact lens is placed on a corneal surface of an eye, for example, a living human eye.

In a further aspect of the present invention, a contact lens is provided which comprises a lens body including a silicone hydrogel and having a varied surface topography with at least one contour that defines a substantially junctionless varying radial thickness of the contact lens. Such varied surface topography may, and preferably does, facilitate at least one of lens comfort, lens orientation, vertical lens translation, and/or lens stabilization when the lens is placed on a corneal surface of an eye. The lens may include a toric surface.

Although, for illustrative purposes, the description of the present invention set forth herein emphasizes contact lenses and methods relating to contact lenses, it is to be understood that the present invention is adapted to ophthalmic lenses in general, and preferably to ophthalmic lenses structured and adapted to be located in or on an eye, and to methods relating to such ophthalmic lenses. All such lenses and methods are included within the scope of the present invention.

The present invention may be adapted for use in producing ophthalmic lenses using any suitable processing technique or combination thereof. In one useful embodiment, the present invention is utilized in conjunction with conventional cast molding techniques, for example in the initial design of a tooling insert having a surface generally corresponding to a desired lens surface. As is well known to those skilled in the art, a tooling insert, or tool, is used to form a mold section which generally defines a negative impression of a surface of a final lens product.

For example, a tooling insert having a three dimensional, substantially junctionless surface designed by a method of the invention, is positioned in a molding apparatus, such as a molding apparatus of conventional design. A moldable composition, such as a polymeric material or a composition of a polymeric material, is introduced into the molding apparatus and subjected to conditions effective to form a mold section having a negative impression of the surface of the tool. The mold section formed by the tool may be either a back surface mold section, or a front surface mold section depending upon the tooling insert design. In other words, the surface of the tool generally corresponds to a face, either a posterior or an anterior face of the ophthalmic lens to be formed.

As is conventional, the mold section is assembled with a complementary mold section to form a lens-shaped cavity therebetween. A contact lens precursor material is introduced into the lens-shaped cavity. Upon demolding or removal from the mold sections, a lens product is obtained.

As is typical, post formation processing steps may be employed to the demolded contact lens product. These steps may include hydration, sterilization, packaging and the like. These steps are well known and are not considered part of the present invention.

In accordance with the present invention, the tooling insert may include irregular or asymmetric surface contours that are customized or unique to the wearer's eye, or contours which are not definable as a substantially junctionless surface by a two dimensional curve or interpolation. The design of the tooling insert preferably is accomplished by a method comprising providing or specifying sample data points from a designated, three dimensional surface, for example, a designated corneal surface or a designated or desired anterior lens surface, interpolating between the data points using at least one algorithm to define a simulated three dimensional designated surface, and forming the simulated three dimensional surface on the tooling insert, for example, on a tooling insert blank.

In this embodiment of the invention, cast molded ophthalmic lenses, for example, contact lenses, are made having improved fit, and/or anterior surface shape and/or vision correction performance and/or other performance relative to conventional or prior art cast molded lenses, for example, that are conventionally produced using symmetric, conic or spherical inserts.

Alternative lens manufacturing techniques may be used in conjunction with the methods of the present invention. For example, the algorithm may be used in conjunction with lens surface forming tools, including but not limited to lathes or mills. The simulated designated three dimensional surface can be cut directly onto a lens blank, for example, using a computer driven surface cutting tool.

In another aspect of the present invention, methods for reshaping corneas are provided. Such methods comprise providing or specifying sample data points from a three dimensional corrected corneal surface, that is a corneal surface to be provided to the cornea of a patient to obtain a desired result, such as a desired vision correction; interpolating between the sample data points using at least one algorithm to produce a smooth, substantially junctionless, simulated three dimensional surface; and providing an optical correction to a cornea by shaping the surface of the cornea to approximate the simulated three dimensional surface. In one useful embodiment, the methods further comprise providing sample data points from a three dimensional surface of the uncorrected surface of the cornea of the patient; and interpolating between the sample data points using at least one algorithm to produce a smooth, substantially junctionless, simulated three dimensional uncorrected surface, which is then employed in the providing step.

The present methods are effective to determine what degree of corneal reshaping is required to achieve a desired vision correction. The simulated three dimensional corrected corneal surface is the surface which will provide the desired correction, for example, vision correction. The uncorrected surface that is interpolated from the sample data points of the uncorrected cornea represents the surface of the cornea prior to reshaping. Thus, the degree of reshaping required to go from the original, uncorrected shape of the cornea to the desired or corrected shape of the cornea for a desired correction is determined.

The reshaping itself can be performed using any suitable method which can be adapted to be controlled in accordance with the present invention. In one particularly useful embodiment, the step of providing a correction includes ablating the surface of the cornea using a computer-driven laser system, such as is conventionally used in reshaping corneal surfaces. The step of providing a correction may include producing an asymmetrical surface on a corneal surface, for example, on a symmetrical corneal surface.

Each and every feature described herein, and each and every combination of two or more of such features, is included within the scope of the present invention provided that the features included in such a combination are not mutually inconsistent.

BRIEF DESCRIPTION OF THE DRAWINGS

The advantages of the present invention will be more readily understood with reference to the following description when considered in conjunction with the appended drawing of which:

FIG. 8 is a schematic diagram illustrating one method for producing lenses in accordance with the present invention.

DETAILED DESCRIPTION OF THE DRAWINGS

Figure 1:
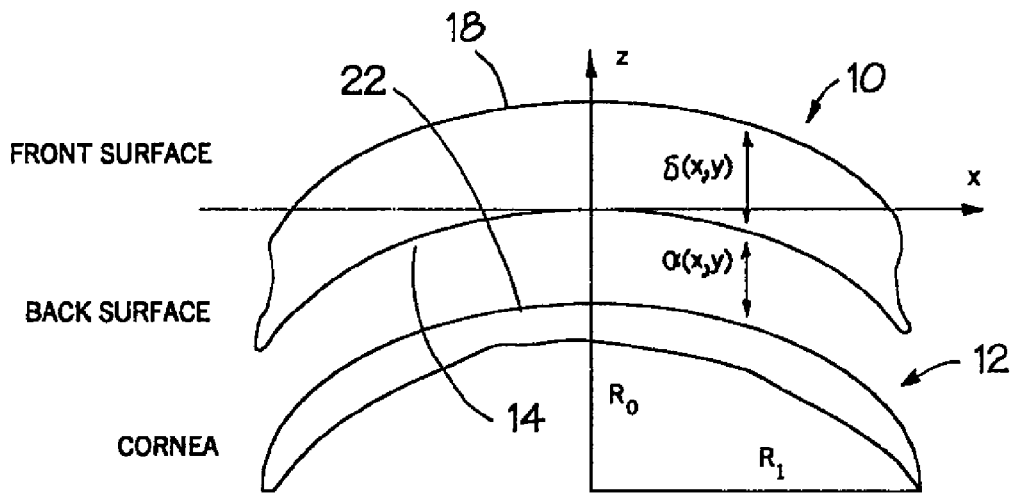
FIG. 1 shows a simplified, cross sectional representation of a contact lens on an eye surface.

The present invention is directed to ophthalmic lenses and methods for designing and producing such lenses, including but not limited to monofocal, multifocal and toric contact lenses, intraocular lenses, corneal inlay lenses and other ophthalmic lenses.

It has been discovered that the methods of manufacturing ophthalmic lenses in accordance with the present invention are particularly advantageous with lenses made from a hydrophilic lens materials, including, but not limited to, hydrophilic silicone polymer components and the like, and mixtures thereof.

In reference to the disclosure herein, a polymeric is hydrogel includes a hydrogel-forming polymer, such as a water swellable polymer. The hydrogel itself includes such a polymer swollen with water. Polymeric hydrogels useful as ophthalmic lenses, for example, contact lenses, typically have about 30% to about 80% by weight water, but may have about 20% and about 90% by weight water, and have refractive indices between about 1.3 and about 1.5, for example about 1.4. Examples of suitable hydrogel-forming polymer materials or components of the disclosed lenses include, without limitation, poly(2-hydroxyethyl methacrylate) PHEMA, poly(glycerol methacrylate) PGMA, polyelectrolyte materials, polyethylene oxide, polyvinyl alcohol, polydioxaline, poly(acrylic acid), poly(acrylamide), poly(N-vinyl pyrilidone) and the like and mixtures thereof. Many of such materials are publicly available. In addition, one or more monomers which do not themselves produce homopolymers which are hydrogel-forming polymers, such as methylmethacrylate (MMA), other methacrylates, acrylates and the like and mixtures thereof, can also be included in such hydrogel-forming polymer materials provided that the presence of units from such monomers does not interfere with the desired formation of a polymeric hydrogel.

Ophthalmic lenses in accordance with the present invention may also be manufactured from a biocompatible, non-hydrogel material or component. Examples of non-hydrogel materials include, and are not limited to, acrylic polymers, polyolefins, fluoropolymers, silicones, styrenic polymers, vinyl polymers, polyesters, polyurethanes, polycarbonates, cellulosics, proteins including collagen-based materials and the like and mixtures thereof.

Preferably, the lenses in accordance with this invention are hydrophilic. Hydrophilic lenses may be constructed from one or more monomeric unit components, i.e., monomeric components. For example, and without limitation, the monomeric unit component may comprise hydrophilic monomers which provide —OH, —COOH, —NCO(CH$_2$)$_3$ (e.g., pyrrolidone) and the like groups. Examples of useful hydrophilic monomeric components include, without limitation, hydroxyalkyl methacrylates, such as hydroxyethyl methacrylate, methacrylic acid N-vinylpyrrolidone, acrylamide, alkyl acrylamides, vinyl alcohol, monomers, such as hydrophilic (meth) acrylates and the like and mixtures thereof, useful for inclusion in hydrophilic silicone polymeric materials, e.g., silicone hydrogels, silicon-containing monomers for polymerization into hydrophilic silicone polymers, siloxanes, such as organosiloxanes and the like and mixtures thereof, silicon-containing acrylates, silicon-containing methacrylates, and the like and mixtures thereof. Preferably, the lens is a hydrogel-containing lens, more preferably a silicone hydrogel-containing lens.

For the sake of simplicity and illustrative clarity, the following detailed description will be directed primarily to the design of contact lenses. It will be appreciated by persons of ordinary skill in the art that the methods in accordance with the invention, possibly with one or more appropriate modifications thereto, can be utilized in the design of these and other types of lenses.

In accordance with a method of the invention, an ophthalmic lens is designed using a mathematical algorithm and a limited number of specifications to achieve a single, continuous, non-compositing mathematical surface in three dimensional space.

More particularly, after a corneal shape is determined for a population or a selected patient, a posterior surface of a contact lens is designed by interpolating between sample scattered data points using a mathematical algorithm, preferably including relationships directed to one or more parameters desired for the resulting lens to have, for example, the space or gap between the cornea and the posterior surface of the lens, as described elsewhere herein, to produce a simulated three dimensional surface (posterior lens surface), for example, that is based at least in part on the corneal shape, such as closely approximating one or more of the varying curvatures of the cornea. In certain embodiments, the lenses are formed to have a posterior surface that corresponds to the surface topography of a cornea, such that a substantially uniform distance is maintained between the posterior surface of the lens and the cornea. By reducing variations in distance between the lens and the cornea, enhanced lens fit and/or lens wearer comfort are obtained. Thickness data as well as specifications or relationships or for one or more lens performance requirements or parameters, as described elsewhere herein, are provided and, in conjunction with the selected mathematical algorithm, define a three dimensional surface (anterior lens surface) having a desired thickness profile.

The simulated three dimensional surfaces can be formed onto a lens using conventional manufacturing techniques, for example by cast molding techniques. Moreover, the present invention complements the use of modern CNC lathes.

By using this approach as detailed herein, anterior and/or posterior lens surfaces can be designed, preferably without substantial compromise.

Referring now to FIG. 1, a simplified, vertical cross sectional view of a contact lens 10 and cornea 12 is shown, taken across x and z coordinate axes, with the y-axis being directed into the page. The lens 10 includes a back surface (i.e. posterior surface) 14, that is tangential to the x and y axes at (0,0,0). The cornea 12 lies a distance $\alpha$ mm below a center of the back surface 14 of the lens 10, and a front surface (i.e. anterior surface) 18 lies a distance $\delta$ mm above the cornea 12. The cornea has a surface 22 that is ellipsoidal with semi-axial lengths $R_0$ and $R_1$, as further described herein.

Any contact lens can be designed using the present invention. However, as indicated herein, it has been found that lenses comprising one or more hydrophilic silicone polymer components particularly benefit from the methods disclosed herein. For example, contact lenses, such as contact lenses containing silicone hydrogel components, in accordance with the present invention which have a varying surface topography effectively facilitate at least one of enhanced lens comfort, enhanced lens orientation, enhanced vertical lens translation, and/or enhanced lens stabilization when placed on a corneal surface. Obtaining one or more of such enhancements with lenses containing silicone hydrogels is particularly useful since such lenses may be used for extended wear, e.g., used in the eye for at least about 1 week or about 2 weeks to about 1 month or more without being removed. Lenses including one or more features of the present invention are particularly useful as extended wear lenses. Such contact lenses include toric contact lenses or multifocal lenses. Thus, substantial benefits, for example, in terms of comfort, orientation, and stabilization, among other things, are obtained with the lenses of the present invention. This is particularly important since lenses which comprise a hydrophilic silicone polymer component typically have a high modulus relative to other hydrogel lenses.

In addition, a lens of the present invention may have a lens body with a portion or portions that are relatively thicker than other portions of the lens body. For example, a lens body may have an inferior portion that is thicker than a superior portion. Or, a lens body may include a plurality of protrusions extending from a surface, such as the anterior surface of the lens body, which result in a greater thickness at those protrusions than the remaining portions of the lens body. Such thickened portions may be particularly useful in toric lenses, and/or multifocal lenses that provide enhanced vertical lens translation. Thus, for example, with extended wear contact lenses, the silicone hydrogel lenses with thickened regions advantageously provide enhanced gas permeability relative to non-silicone hydrogel lenses. The silicone hydrogel lenses typically have enhanced oxygen and carbon dioxide permeability, relative to other (non-silicon-containing) hydrogel lenses.

Figure 2A:
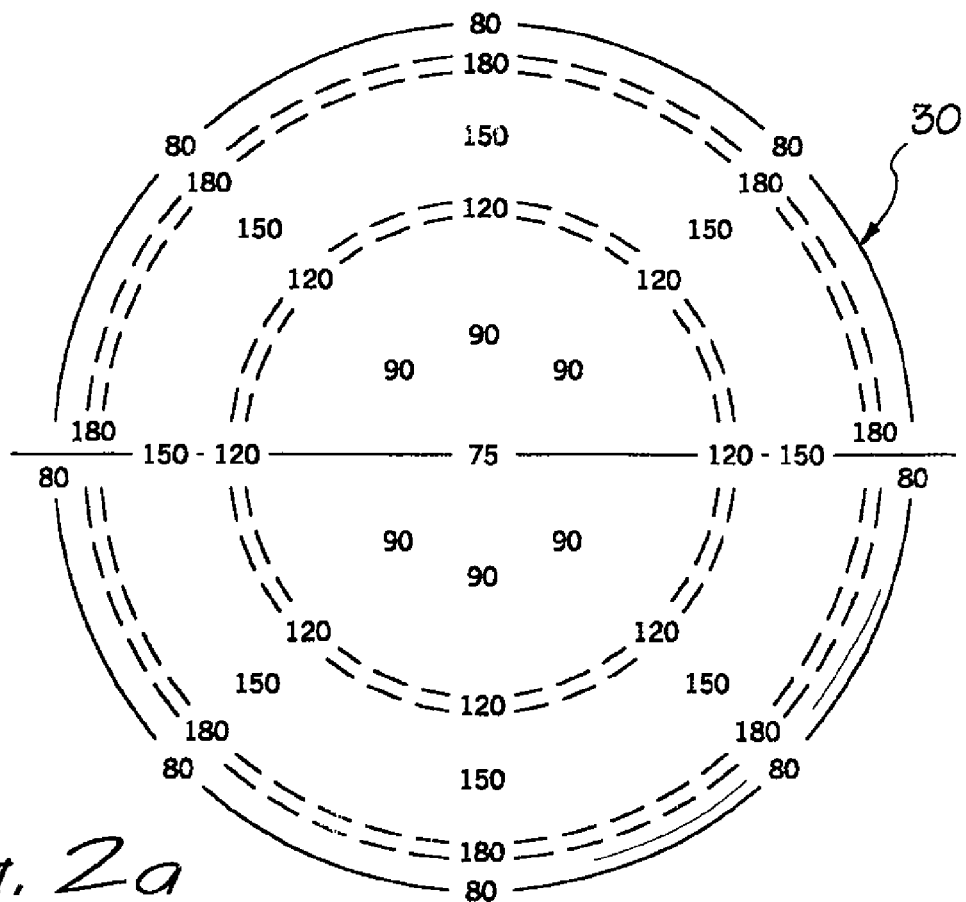
FIGS. 2a, 2b and 2c show, respectively, a front view representation including thickness data, a nominal radial thickness profile for a horizontal cross-section through the lens center and a side view of a rotationally symmetric, spherical contact lens designed in accordance with a method of the present invention. The regions bounded by broken lines (2a) designate transition regions between adjacent areas of substantially different surface types.
Figure 2B:
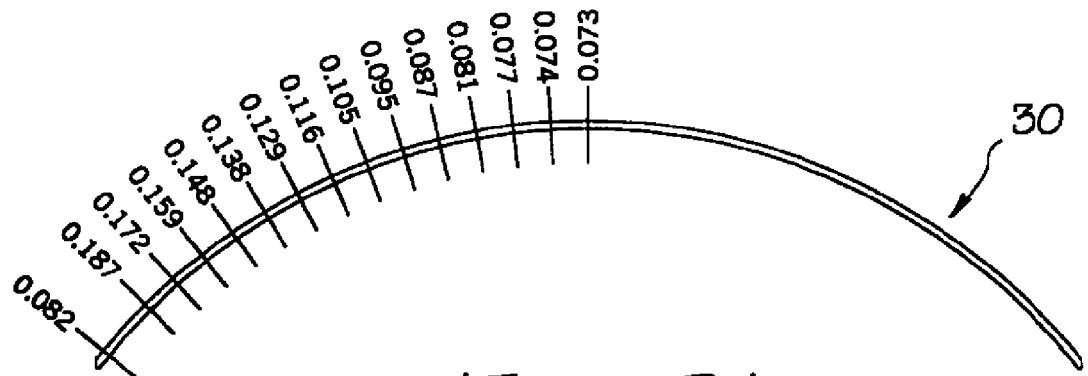
Figure 2C:
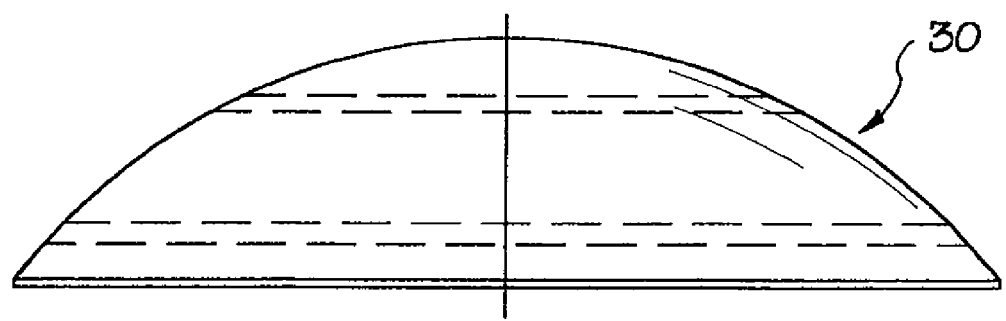

For example, turning now to FIGS. 2a-2c, a rotationally symmetric, single vision contact lens 30 is shown, to represent one of the most simplest contact lens designs.

Figure 3A:
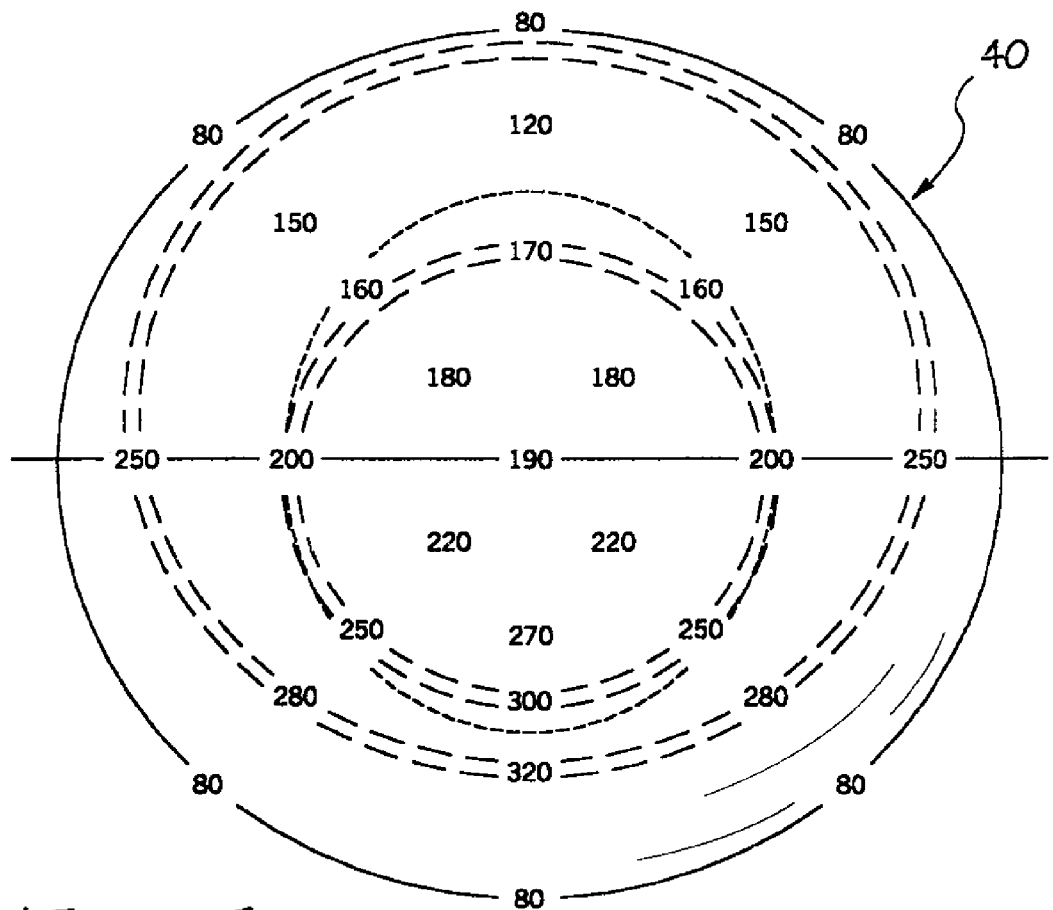
FIGS. 3a, 3b and 3c show, respectively, a front view representation including thickness data, a nominal radial thickness profile for a horizontal cross-section through the lens center and a side view of a rotationally asymmetric, toric contact lens designed in accordance with a method of the present invention. The regions bounded by broken lines (3a) designate transition regions between adjacent areas of substantially different surface types.
Figure 3B:
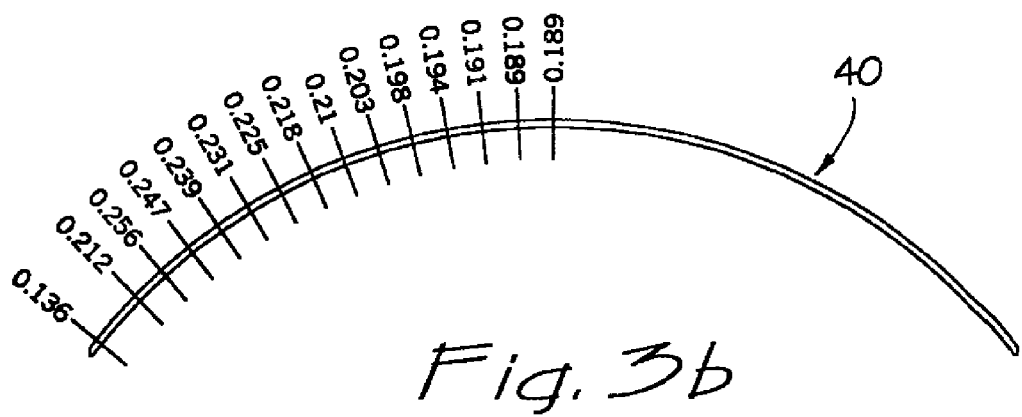
Figure 3C:
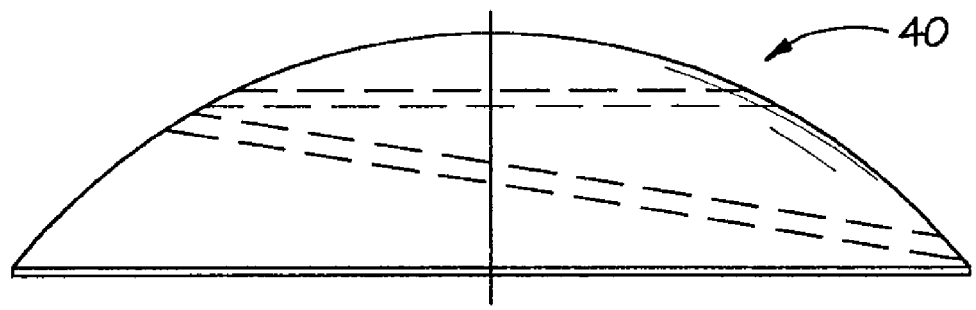

The present invention is particularly advantageous in the design and production of more complex, rotationally asymmetric lenses. For example, FIGS. 3a-3c show a toric contact lens 40, specifically a prism ballast toric lens, designed in accordance with the invention.

Figure 4:
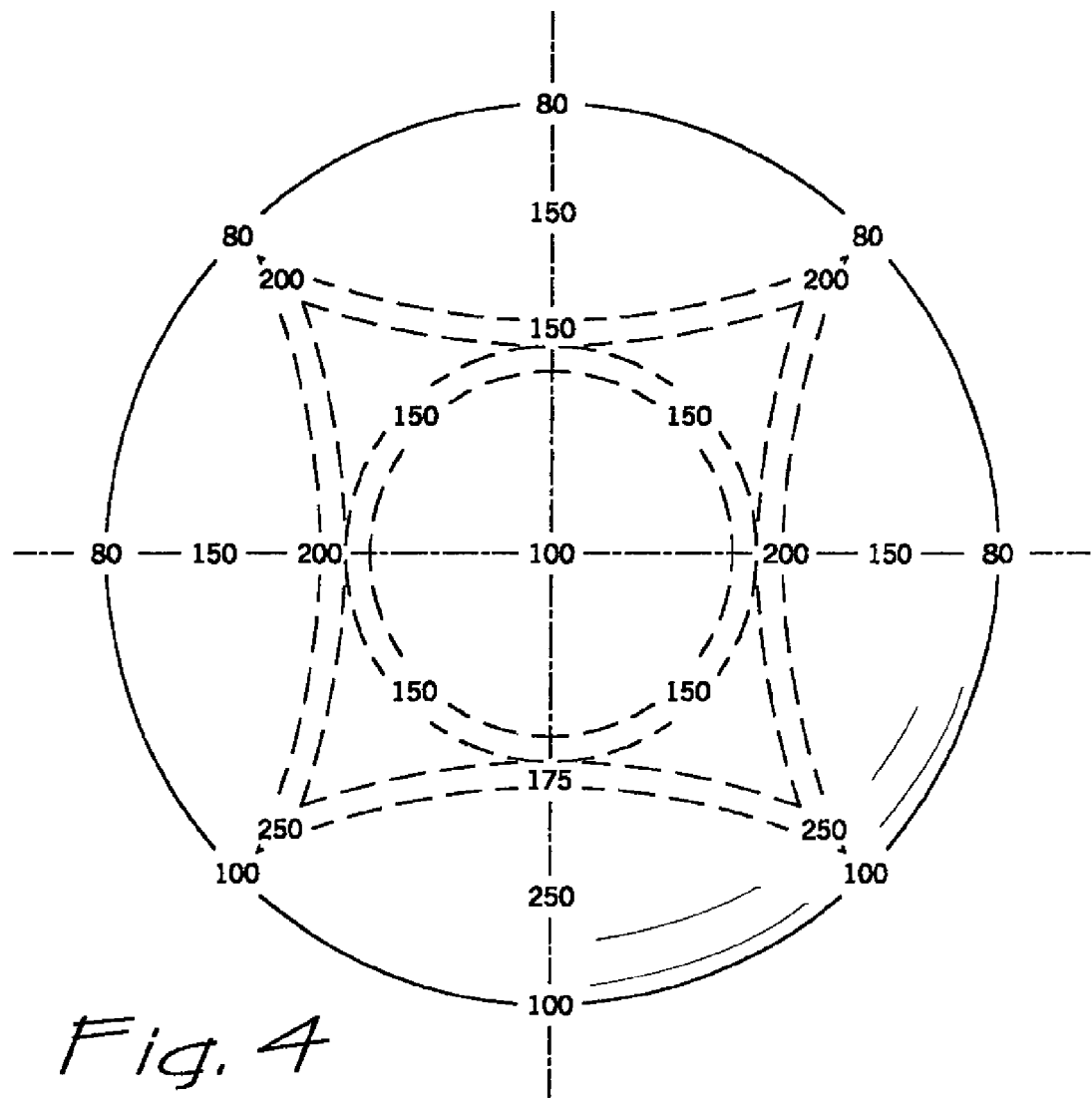
FIG. 4 shows a front view representation, a cross-sectional view including thickness data of a complex design contact lens designed in accordance with a method of the present invention. The regions bounded by broken lines designate transition regions between adjacent areas of substantially different surface types.

FIG. 4 shows a very complex lens design, produced in accordance with the present invention. This complex lens includes asymmetrical three dimensional surface components that can not be satisfactorily designed using conventional two dimensional methods and techniques.

Lens design using the present invention more specifically comprises the following steps. A corneal shape of a patient is first determined. A selected number of sample data points representing the cornea are provided using conventional means. A desired fitting relationship of the lens back surface to the cornea is then specified to meet the wearer's physiological, physical and/or optical requirements. A simulated three dimensional surface is then defined using an algorithm to interpolate between the data points. This simulated three dimensional surface can be formed on a tooling insert, or directly onto a lens posterior surface, for example by using a computer driven surface cutting tools, mills or lathes.

Next, an anterior surface of the lens is designed. Particularly, key lens thickness data points are specified to achieve the desired clinical performance, e.g. vision correction, rotational orientation of a toric lens and the like. Examples of such thickness data for the three lens types are shown in FIGS. 2a-2b, FIGS. 3a-3b, and FIG. 4. The anterior surface of the lens is now designed by using an algorithm in conjunction with the key lens thickness data.

In certain embodiments, the lens is designed to correct or reduce wavefront aberrations of a patient's eye.

A wavefront aberration is the three dimensional profile of the distance between a real light wave front of a central spot of light and a reference surface, e.g., an ideal spherical shape, as shown in FIG. 1 of U.S. Pat. No. 6,585,375, and as described in Mierdel et al., "Der Ophthalmologe", No. 6, 1997, the entire disclosures of each of which is hereby incorporated by reference. A wavefront aberration may be understood to be an optical path difference between an actual image wavefront and an ideal reference wavefront centered at an image point, at any point in the pupil of an eye. Methods of measuring wave-front aberration are well known to persons of ordinary skill in the art.

Briefly, and as described by Nader, N., *Ocular Surgery News*, "Learning a new language: understanding the terminology of wavefront-guided ablation" (Feb. 1, 2003), an aberrometer (e.g., an instrument that measures the aberrations of an eye) may be used to measure an aberrated image that leaves an eye, or may be used to measure the shape of a grid projected onto the retina. For example, while a patient is maintaining a view on a visual fixation target, a relatively narrow input laser beam may be directed through the pupil and focused onto the retina of the patient's eye to generate a point-light source on the retina. The light is reflected from the retina back through the pupil, and the wavefront of the light passing from the eye is passed to a wavefront sensor. As understood by persons of ordinary skill in the art, a wavefront can be defined as a surface that connects all field points of an electromagnetic wave that are equidistant from a light source. The light rays leave the eye and may pass through an array of lenses that detects the light rays' deviation. The wavefront gets deviated or distorted by inhomogeneities in the refractive properties in the refractive media of the eye, such as the lens, the cornea, the aqueous humor, and the vitreous humor. The resulting image is then typically recorded by a charge coupled device (CCD) camera, for example.

The wavefront is then typically reconstructed and the deviations are described mathematically in three dimensions. The wavefront deviations may be calculated, at least in part, by analyzing the direction of the light rays. Generally, parallel light beams indicate a wavefront with little, if any, aberrations, and nonparallel light beams indicate a wavefront with aberrations that do not give equidistant focal points.

Typically, Zernike polynomials are used to measure or analyze the ocular aberrations. Each Zernike polynomial describes a shape or a three-dimensional surface. As understood by persons of ordinary skill in the art, Zernike polynomials are an infinite set, but in ophthalmology, the Zernike polynomials are usually limited to the first fifteen polynomials. Second-order Zernike terms represent conventional aberrations, such as defocus and astigmatism.

Aberrations above second-order aberrations are called higher-order aberrations. Higher-order aberrations typically cannot be corrected by conventional spherocylindrical lenses. Examples of higher-order aberrations include, but are not limited to, coma, spherical aberrations, trefoil (wavefronts with threefold symmetry), and quadrefoil (wavefront shapes with fourfold symmetry). Many higher-order aberrations are not symmetrical, but some higher-order aberrations, such as spherical aberrations, may be symmetrical.

In accordance with the present invention, the wavefront aberration of a patient's eye may be measured and analyzed to facilitate appropriate lens construction. The lenses of the present invention can then be shaped, as discussed herein, taking into account the configuration or topography of the patient's corneal surface, as well as any wavefront aberrations. For example, by first shaping the lens body to have a posterior surface that corresponds to the corneal surface topography of an eye, and then shaping the lens body to correct any wave-front aberration associated with the patient's eye. Thus, a contact lens is obtained with a lens body configured to correct a wavefront aberration of a patient's eye. Advantageously, contact lenses are provided that may be custom-fit for a particular patient taking into consideration factors, such as, corneal surface topography, astigmatisms, wavefront aberrations, and variations in optical power. In one embodiment, a contact lens is provided with a ballast, and an optical zone including a wavefront aberration corrective surface. The wavefront aberration corrective surface may be provided on either the anterior surface, the posterior surface, or both the anterior and posterior surfaces. Thus, in certain embodiments, the present lenses correct or reduce higher-order wavefront aberrations. In situations where the higher-order wavefront aberrations are asymmetrical, the lenses are configured to substantially maintain a desired orientation to correct the wavefront aberrations. In some embodiments, the wavefront aberration correction orientation is achieved by utilizing a ballast on the lens.

In other embodiments, the lens may include a plurality of thickened regions or portions which facilitate proper orientation to correct or reduce a wavefront aberration.

Figure 5A:
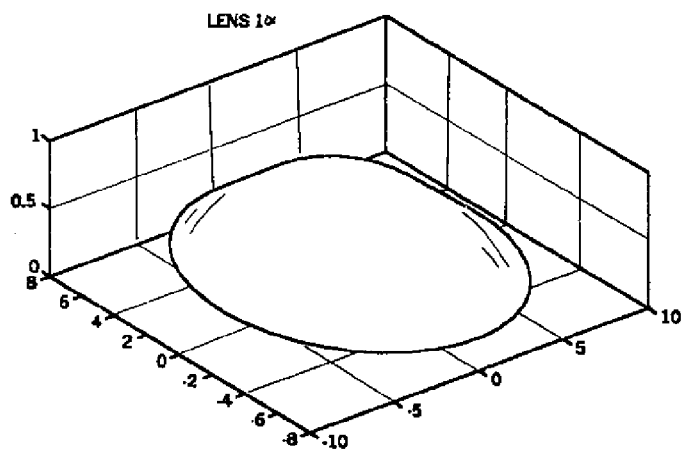
FIGS. 5a and 5b show three dimensional representations of, respectively, a rear surface/cornea separation ($\alpha$) and a radial thickness ($\delta$) profile for the radially symmetric lens of FIGS. 2a-2c.
Figure 5B:
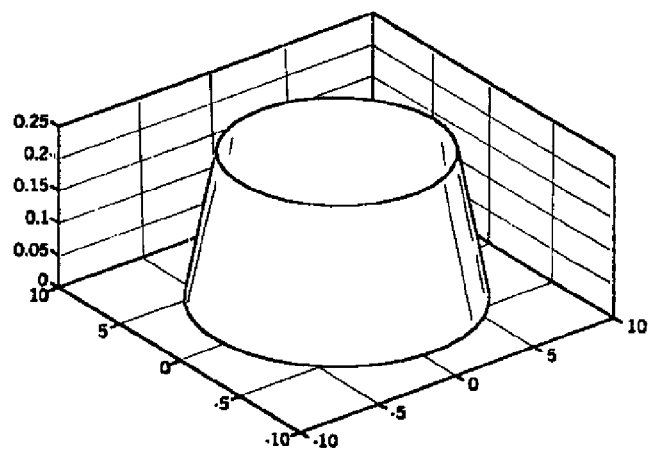
Figure 6A:
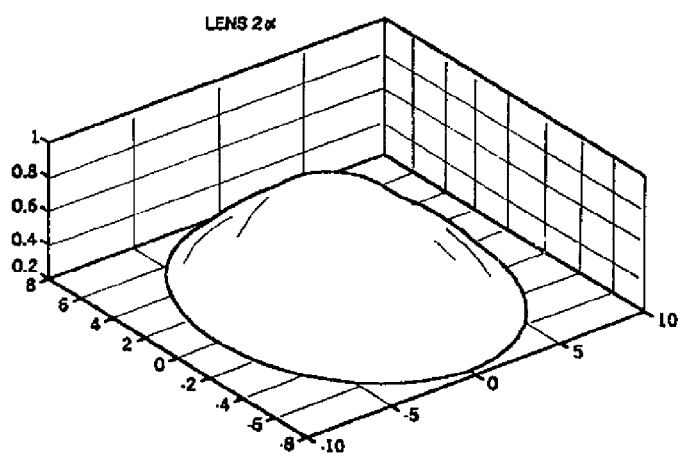
FIGS. 6a and 6b show three dimensional representations of, respectively, a rear surface/cornea separation ($\alpha$) and a radial thickness ($\delta$) profile for the toric lens of FIGS. 3a-3c.
Figure 6B:
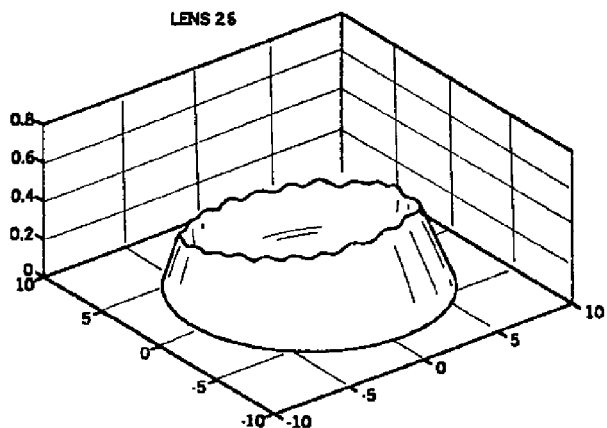
Figure 7A:
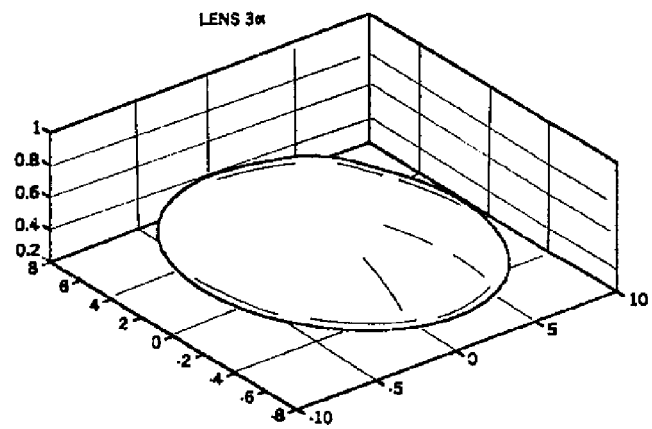
FIGS. 7a and 7b show three dimensional representations of, respectively, a rear surface/cornea separation ($\alpha$) and a radial thickness ($\delta$) profile for the complex design lens of FIG. 4.
Figure 7B:
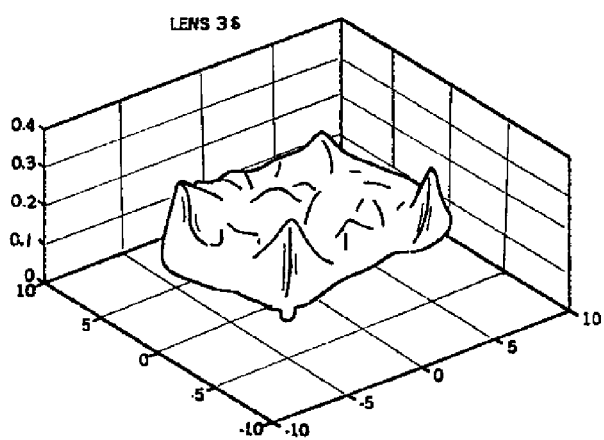

The outcomes of the construction of posterior and anterior surfaces, in accordance with a method of the invention, of the three lens types are demonstrated by the three dimensional schematic representations in FIGS. 5a-7b. More specifically, FIGS. 5a, 6a and 7a show rear surface/cornea separation of the three lens types, and FIGS. 5b, 6b and 7b show radial thickness profiles of the three lens types.

Turning now specifically to FIGS. 7a and 7b, the complex lens design is shown as smooth and substantially junctionless, despite the varied surface topography thereof. Those of skill in the art will appreciate that this complex lens design cannot be produced using conventional two dimensional mathematically based lens design techniques and methods. It is further noted that the contours of the lens surface shown in FIG. 7b can not be produced using offset rotationally symmetric curves and other sophisticated current design methods.

The step of providing sample data points may be accomplished using conventional techniques and equipment in which sample data points, for example, sagittal depths, can be designated, supplied or selected, for representing the designated surface.

As will be appreciated by those skilled in the art, the task of mathematically representing a surface smoothly in three dimensions, given a limited number of scattered data points and specifications, can be accomplished by many methods and for particular shapes and design specifications. It is known that one algorithm may provide a better description than another, for example by providing different degrees of accuracy. The present invention can be exemplified by three algorithms, which follow hereinafter, although it is recognized that the present invention is not limited to any particular algorithms or combinations of algorithms.

The step of forming the lens surface having the three dimensional contour may include shaping a lens using a computer driven mill or lathe or other suitable cutting tool. The simulated three dimensional surface may be inputted in digital form into a computer driven lathe, and the lathe programmed to cut the junctionless, three dimensional surface into a lens blank, a tooling insert (for example in cast molded lenses), or a cornea (for example during laser surgery).

The central portion of an ophthalmic lens is typically referred to as the "optical zone" of the lens in that it provides the optical correction. Depending on the wearer, the optical zone may be described by a spherical conic section, or it may be another, more complicated configuration, such as a toric optical zone. The present invention is especially advantageous in design of toric contact lenses, as well as even more complex designs.

Contact lenses having a toric surface, such as a toric optical zone (commonly referred to as "toric contact lenses") are commonly used to correct refractive abnormalities of the eye relating to astigmatism. Astigmatism may be associated with other refractive abnormalities, such as myopia (nearsightedness), and hypermetropia (farsightedness), presbyopia and the like. Toric contact lenses can be prescribed with one or more spherical corrections.

Whereas spherical contact lenses may freely rotate on the eye, toric contact lenses typically include a ballast, or a thickened lens section, to inhibit or reduce rotation of the lens on the eye such that the cylindrical axis of the toric zone remains generally aligned with the axis of the astigmatism. The ballast provides an asymmetric component to the lens that can be addressed by the present invention. In certain embodiments, a ballast is defined by varying the anterior surface of the lens body. In other embodiments, a ballast is defined by varying both the anterior surface and posterior surface of the lens body.

Multifocal contact lenses may be provided with a varied surface topography to facilitate vertical lens translation. The varied surface topography may include a ballast, or may include another structural feature on the anterior surface, the posterior surface, or both the anterior surface and posterior surface of the lens, such as one or more protuberances or protrusions, that facilitate vertical lens translation. Examples of protuberances include ledges, ridges, lips, and ribs, among other things.

Ridges and ribs may be provided as regions of the lens body that project anteriorly from the anterior surface of the lens body. A ledge may be provided as a region of the lens body where the lens body rapidly, but smoothly, transitions from a thickened region to a thinner region.

Vertical lens translation, as used herein, refers to the relative up and down, or vertical, movement of the contact lens on an eye with respect to the pupil of the eye. Thus, vertical lens translation may refer to changes in relative position of the contact lens with respect to the pupil of the eye caused by movement of the lens, movement of the eye, or a combination of movement of the lens and the eye.

By way of example, and not by way of limitation, a multifocal lens, such as a bifocal lens, may include an optical zone with two optical powers. Thus, the optical zone may have an inferior portion with a first optical power, and a superior portion with a second optical power.

The inferior portion of the optical zone may have an optical power suitable for reading, thereby defining a reading or near zone. Typically, when the eye with the multifocal optical zone is looking forward (e.g., towards the horizon), the reading zone will be located below or substantially below the center of the pupil of the eye, and substantially all of the vision correction is provided by the superior portion of the optical zone of the lens. As the eye moves down to look at a book, for example, the lens of the present invention will typically effectively move vertically upward so that the reading zone covers at least a portion of the pupil to provide vision correction based on the optical power of the reading zone.

In certain embodiments, the effective upward movement of the lens may be achieved by substantially maintaining the lens in a fixed position as the eye rotates downward so that the pupil is covered by the inferior portion of the lens as the eye moves downward. In other embodiments, the effective upward movement of the lens may be achieved by movement of the lens upwardly, for example, by actions imposed on the lens by one or more of the eyelids of the eye. In yet another embodiment, a lower eyelid may engage with a ballast or other feature on the surface of the lens to hold the lens in a relatively fixed position. As the eye looks down, for example by rotating, the lower eyelid may move the lens slightly downward, but the rotation of the eye is relatively greater than the movement of the lens to cause the pupil to be covered by at least a portion of the inferior zone of the optical zone.

The varied surface topography of such lenses may be in the form of a ballast, which may be formed by varying the thickness or shape of the anterior and/or posterior surface of the lens body. In some embodiments, effective vertical lens translation is obtained by controlling the rate of change of lens thickness. Compared to toric contact lenses, multifocal lenses with ballasts may have a relatively greater rate of change in the ballast region. Thus, the multifocal lenses in accordance with the present invention may have ballasts that are configured to provide effective vertical lens translation, as described above.

With particular reference to FIG. 8, the present invention further includes tools or tooling inserts 112 and 113 useful for cast molding a posterior surface and an anterior surface, respectively, of an ophthalmic lens. The tooling inserts 112 and 113 are adapted to be placed in molding apparatus 115 and 116 in forming a first mold section or half 117 and a second mold section or half 118, each having a negative impression of a surface of the respective tooling insert. The surfaces of the inserts 112 and 113 are substantially smooth, junctionless three dimensional asymmetrical surfaces corresponding to a desired ophthalmic lens posterior surface and anterior surface, respectively. The mold sections or halves 117 and 118 are assembled together to form an assembled mold 120, which defines a lens-shaped cavity. A polymerizable/curable monomer composition is placed in the cavity and is processed, e.g., polymerized and/or cured, to form a contact lens. Such processing may be conventional and well known in the art and, therefore, needs not be described in detail. The lens is demolded and may be subjected to conventional additional processing steps, such as sterilization, packaging and the like.

Tool inserts and molding sections produced by such tool inserts, as described herein, are within the scope of the present invention.

In another embodiment of the invention, a method for reshaping the cornea of an eye is provided. The method generally comprises selecting or designating sample data points representing a corrected corneal surface of an eye of a patient, e.g., human being, and interpolating, using at least one algorithm, between the sample data points, to produce a substantially smooth, continuous, three dimensional surface. Preferably, sample data points from a three dimensional surface of the uncorrected surface of the patient's cornea are obtained and are interpolated between using at least one algorithm to produce a smooth, substantially junctionless simulated three dimensional uncorrected surface. Using a conventional computer driven laser system supplied with the simulated surface contour, and preferably the simulated uncorrected surface contour, the cornea is reshaped to approximate the simulated surface contour. In this embodiment of the invention, the method can be used with conventional corneal refractive laser surgical systems to alter the refractive capabilities of the eye by selectively ablating or reshaping the corneal stromal tissue, and in some cases, following temporary removal of an anterior corneal flap. The method is useful in producing an asymmetric surface, such as a corneal surface, for example, to correct astigmatism, in providing custom corneal shaping for improved optical correction, in providing a correction centered over the corneal apex which is often not aligned with the pupil center and the like.

The following non-limiting Examples illustrate certain aspects of the invention.

EXAMPLES

Designing a Toric Lens Based on a Method of the Present Invention

The steps to be employed to design a toric contact lens in accordance with the present invention include:

(1) Determine a corneal shape.
(2) Select and represent a desired lens/cornea fitting relationship.
(3) Specify a posterior surface including a toric optical zone.
(4) Use Algorithm X to represent the posterior surface of the lens in three dimensions.
(5) Specify center thickness of the lens.
(6) Select an optical power of the lens.
(7) Determine lens mass distribution (selected sample points).
(8) Use Algorithm X to represent the anterior surface of the lens in three dimensions, including a graphical representation.

Algorithm X can be any suitable algorithm effective for interpolation to provide the desired simulated three dimensional surfaces. Three such mathematical methods using suitable algorithms used in interpolation between data points are provided and discussed below.

Interpolation Methods

Generally speaking, a list of n data points and their values $(z_1 \ldots z_n)=[z(x_i, y\alpha)_1 \ldots z(x_n, y_n)]$ is specified which constitutes an incomplete representation of the unknown underlying surface $f^*(x, y)$. Overall, an interpolating function $f(x,y)$ is chosen for which $f(x_i,y_i)=z_i$, $i=1, \ldots, n$ and $f \to f^*$ monotonically as $n \to \infty$.

It has been assumed that the smoothness of the underlying surface $f^*$ is generally considered to be at least $C^1$ (or possibly piecewise $C^1$), and this assumption is built into the mathematical formation.

I. The Shepard Method (Shepard 1968)

In the basic Shepard method, the interpolated value $\phi$ at any point (x,y) is defined by a weighted sum of the data points, where the weighting is proportional to the inverse square of the distance between (x, y) and the data points.

In its simplest form, the algorithm can be represented by the equation $$\phi(x, y) = \frac{\sum_{i=1}^{N} h_i |(x, y) - (x_i, y_i)|^{-2}}{\sum_{i=1}^{N} |(x, y) - (x_i, y_i)|^{-2}}$$

where $h_i$ is the ith data point, $(x_i, y_i)$ its position, and N is the number of data points.

II. The Interpolation Method (Cline and Renka, 1984)

The following is a summary description of the interpolation method hereinafter referred to as the CR scheme; this method is described more fully in, Cline A. K. and Renka, R. J., "A Storage-efficient Method for Construction of A Thiessen Triangulation", Rocky Mountain J. Math. 14(1), 119-139 (1984); Renka, R. J. and Cline, A. K., "A Triangle-based $C^1$ Interpolation Method", Rocky Mountain J. Math. 14(1) 223-237 (1984); and Renda R. J., "Algorithm 624: Triangulation and Interpolation At Arbitrarily Distributed Points In The Plane"; ACM Trans. Math, Software 10(4) 440-442 (1984). Each of these Publications is incorporated in its entirety herein by reference.

The CR scheme comprises the following steps:

a. Partition the convex hull associated with the set of known data points $\{(x_1, y_1), \ldots (x_n, y_n)\}$ into triangles (CR Step 1).

b. Estimate the partial derivatives of the interpolating function $f(x,y)$ at each data point (CR Step 2).

c. For any arbitrary point $(x_0,y_0)$ in the convex hull, the value of the interpolating function $f(x_0,y_0)$ can then be calculated using the data values and partial derivatives at each of the vertices of the triangle containing $(x_0,y_0)$. The calculation is based on a cubic surface capping the triangle (CR Step 3).

Step 1. Triangulation.

Let S be the set of nodes (data points) $\{(x_1, y_1), \ldots (x_n, y_n)\}$, where $n \geq 3$ and $(x_i, y_i) \neq (x_j, y_j)$ for $i \neq j$. $N_i$ is used to denote the node $(x_i, y_i)$. Let H be the convex hull of S.

A triangulation of S is a set of triangles T with the following properties: (i) each triangle contains exactly three nodes, (ii) the interior regions of the triangles are pairwise disjoint, and (iii) every point in H is contained in some triangle of T.

To maximize the accuracy of Steps (ii) and (iii) above, construct a triangle that is as nearly equiangular as possible. To do this, define an arc as the undirected line segment $N_i \Leftrightarrow N_j$, $i \neq j$, joining two vertices of a triangle in T. An arc $N_i \Leftrightarrow N_j$ is locally optimal if it lies on the boundary of H or if the quadrilateral defined by a pair of adjacent triangles that share nodes is not strictly convex.

The triangulation required is one in which all arcs are locally optical. The resulting triangulation is called a Thiessen triangulation, or a Delaunay triangulation. Cline and Renka (1984) give the following algorithm for producing a Thiessen triangulation.

For each node $N_i$, define the Thiessen region associated with $N_i$ to be the set of points (x,y) which satisfy $|(x,y)-N_i|(x,y)-N_j|$ for all $i \neq j$.

A pair of nodes $N_1$, $N_2$ are said to be Thiessen neighbours if their corresponding Thiessen regions share at least one point. If the regions share exactly one point, $N_1$ and $N_2$ are called weak Thiessen neighbours, if they share two or more points, they are called strong Thiessen neighbours.

Connect all pairs of strong Thiessen neighbours, and arbitrarily choose k–3 nonintersecting arcs connecting weak neighbours when k nodes lie on a common circle ($k \geq 4$).

Step 2. Estimate Partial Derivatives of the Interpolating Function f(x,y) at Each Data Point.

After performing the triangulation, the next step in the CR scheme is to determine the partial derivatives of the interpolating functions at each node.

The value of the following partial derivative vectors are to be found:

$$D_{(x,y)} = \left( \frac{\partial f}{\partial(x, y)}(x_1, y_1), \ldots, \frac{\partial f}{\partial(x, y)}(x_n, y_n) \right) \quad (1)$$

Such vectors minimize the $L_2$ norm of the linearized curvature over H of the interpolating function f(x,y). This leads directly to the problem of finding the value of the partial derivatives (1) which minimize the quadrilateral functional $$Q_k(D_x, D_y) = \int_{l_k} \left\{ \left( \frac{\partial^2 f}{\partial x^2} \right)^2 + 2 \left( \frac{\partial^2 f}{\partial x \partial y} \right)^2 + \left( \frac{\partial^2 f}{\partial y^2} \right)^2 \right\} dx dy$$

where $P_k$ is the patch of triangles containing node k. As described in Renka and Cline (1984), equation (2) leads to a linear system $$\frac{\partial Q_k}{\partial D_x} = 0, \frac{\partial Q_k}{\partial D_y} = 0 \quad (3)$$

which is solved by a block Gauss-Seidel method to recover the required derivatives $D_x$ and $D_y$.

Step 3. Sampling.

For any arbitrary point in the convex hull, the value of the interpolating function can be calculated using the data values and partial derivatives at each of the vertices of the triangle containing the arbitrary point. The calculation is based on a cubic surface capping the triangle.

The previous two steps have constructed the skeleton of the interpolating function at the known data points of the surface. In the absence of an elementary formula for the underlying surface, the mathematical description of the surface will be complete when the algorithm representing f(x,y) returns a reasonable value for any $(x,y)=(x_0,y_0)$ in the region of interest.

This process is a common one in interpolation and finite-element analysis, and therefor will not be described in detail herein. In summary, the value of $f(x_0,y_0)$ for some $(x_0,y_0)=H$ is calculated by a procedure due to Lawson (1976). On the triangle T containing $(x_0,y_0)$, the local structure of f is represented by the cubic element F (x,y) spanning the triangle, so that $f(x_0,y_0)=F(x_0,y_0)$. The local element F has the following properties:

1. F is a true cubic (not bicubic) in each of the three subtriangles of equal area formed by connecting the vertices to the barycenter of the triangle containing $(x_0, y_0)$.
2. F is $C^1$
3. On each triangle edge, $N_i \Leftrightarrow N_j$, F is a Hermite cube interpolate of $z_i, z_j$ and their directional derivatives at the endpoints $N_i$ and $N_j$. Furthermore, the derivative of F in the direction normal to $N_i \Leftrightarrow N_j$ interpolates the normal derivative at $N_i$ and $N_j$.

The last two properties guarantee the $C^1$ continuity across triangle borders (and hence over the whole region H), since the derivatives at any point on a triangle side are completely determined by their values at the endpoints of the side.

With the construction of local cubic elements F, values lying between the local known data points can be determined. The surface is thus knowable at any point in the region covered by the data.

III. Interpolation Method (The Bicubic Spline)

This interpolation method, described in Dierck, P., "An Algorithm for Surface Fitting With Spline Functions", IMA Journal of Numerical Analysis, v. 1, pp. 267-283 (1981), calculates a smooth, bicubic spline approximation $\phi(x,y)$ to the set of scattered data points $(x_i, y_i, h_i)$ weights $w_i$, where $i=1 \ldots N$. The spline is given the B-spline representation $$\phi(x, y) = \sum_k \sum_l c_{kl} Q_k(x) P_l(y) \quad (4)$$

where $Q_k(x)$ and $P_l(y)$ are normalized cubic B-splines defined on an interactively calculated set of knots, and the coefficients $C_{kl}$ are to be determined.

At the kth iteration, the current knot set is used to fit a bicubic spline to the data in a least—squares sense. The residual variance $$\theta = \sum_{i=1}^{N} w_i^2 (h_i - \phi_k(x_i, y_i))^2 \quad (5)$$

is then calculated. If $\theta$ is greater than a user-specified non-negative limit S, the knot set is refined by adding extra knots in regions where the fit is most poor (that is, where θ is largest) to produce the knot set for the (k+1)th iteration. After many such iterations, the criterion θ≦S is satisfied, the set of knots is accepted.

The above-noted publication by P. Kierck is hereby incorporated in its entirety herein by reference.

The final approximation to the surface is then calculated as the solution to the optimization problem of finding the coefficients in equation (4) that minimizes a global smoothness measure subject to the constraint θ<S.

Although there has been hereinabove described specific ophthalmic lenses having a junctionless, three dimensional surface, and methods for producing same, in accordance with the present invention, for the purpose of illustrating the manner in which the present invention may be used to advantage, it should be appreciated that the invention is not limited thereto.

While this invention has been described with respect to various specific examples and embodiments, it is to be understood that the invention is not limited thereto and that it can be variously practiced within the scope of the following claims.

What is claimed is:

1. A contact lens comprising:
a cast-molded lens body including a silicone hydrogel and structured and adapted to be located on an eye and having an anterior surface and a generally opposing posterior surface, wherein the anterior surface is a substantially smooth, junctionless three dimensional asymmetrical surface, and has a varied anterior surface topography with at least one contour that defines a substantially junctionless varying radial thickness of the contact lens, the varied anterior surface topography facilitating at least one of lens comfort, lens orientation, vertical lens translation, and lens stabilization when the contact lens is placed on a surface of a cornea of an eye, and the lens body being configured to correct or reduce a higher-order wavefront aberration of a patient's eye.

2. The contact lens of claim 1 wherein the posterior surface is a substantially smooth, junctionless three dimensional asymmetrical surface.

3. The contact lens of claim 1, wherein the lens body includes a toric surface.

4. The contact lens of claim 1, wherein the posterior surface of the lens body is structured to approximate a curvature of a corneal surface when the lens body is placed on a surface of a cornea of an eye.

5. The contact lens of claim 1, wherein the lens body includes a multifocal optical zone.

6. The contact lens of claim 1, which is a silicone hydrogel lens structured for comfortable use in an eye for at least about 1 week without being removed.

7. The contact lens of claim 1, which is swelled with water.

8. A contact lens comprising:
a cast-molded lens body including a hydrophilic silicone polymer component, the lens body having a toric surface, a substantially smooth, junctionless three dimensional asymmetrical anterior surface, and a varied anterior surface topography defining a ballast and having at least one contour that defines a substantially junctionless varying radial thickness of the contact lens, the varied anterior surface topography facilitating at least one of lens comfort, lens orientation, vertical lens translation, and lens stabilization when the contact lens is placed on a surface of a cornea of an eye, and the lens body being configured to correct or reduce a higher-order wavefront aberration of a patient's eye.

9. The contact lens of claim 8, wherein the lens body comprises a silicone hydrogel.

10. The contact lens of claim 8, wherein the hydrophilic silicone polymer component includes units from at least one monomer selected from a group consisting of silicon-containing monomers for polymerization into hydrophilic silicone polymers and mixtures thereof.

11. The contact lens of claim 10, wherein the at least one monomer is selected from the group consisting of siloxanes, silicon-containing acrylates, silicon-containing methacrylates, and mixtures thereof.

12. The contact lens of claim 8, wherein the lens body is structured to correct an astigmatism of an eye.

13. The contact lens of claim 8, wherein the lens body includes a substantially smooth, junctionless three dimensional asymmetrical posterior surface.

14. The contact lens of claim 8, wherein the lens body includes a posterior surface structured to approximate a curvature of a corneal surface when the lens body is placed on a surface of a cornea of an eye.

15. The contact lens of claim 14, wherein the posterior surface is structured to maintain a substantially uniform distance between the posterior surface of the lens body and the corneal surface when the lens body is placed on a surface of a cornea of an eye.

16. The contact lens of claim 8, which is a silicone hydrogel lens structured for comfortable use in an eye for at least about 1 week without being removed.

17. The contact lens of claim 8, which is swelled with water.

18. A contact lens comprising:
a cast-molded lens body including a hydrophilic silicone polymer component, the lens body being structured and adapted to be located on an eye and having an anterior surface and a generally opposing posterior surface, wherein the anterior surface is a substantially smooth, junctionless three dimensional asymmetrical surface, and has a varied anterior surface topography defining a ballast and at least one contour that defines a substantially junctionless varying radial thickness of the contact lens, the varied anterior surface topography facilitating at least one of lens comfort, lens orientation, vertical lens translation, and lens stabilization when the contact lens is placed on a surface of a cornea of an eye, and the lens body being configured to correct or reduce a higher-order wavefront aberration of a patient's eye.

19. The contact lens of claim 18, wherein the lens body includes a silicone hydrogel.

20. The contact lens of claim 18, wherein the lens body includes a toric surface.

21. The contact lens of claim 18, wherein the posterior surface is a substantially smooth, junctionless three dimensional asymmetrical surface.

22. The contact lens of claim 18, wherein both the anterior surface and the posterior surface are substantially smooth, junctionless three dimensional asymmetrical surfaces.

23. The contact lens of claim 18, which is a silicone hydrogel lens structured for comfortable use in an eye for at least about 1 week without being removed.

24. The contact lens of claim 18, which is swelled with water.

25. A contact lens comprising:
a cast-molded lens body including a hydrophilic silicone polymer component, the lens body having a multifocal optical zone, a substantially smooth, junctionless three dimensional asymmetrical anterior surface, and a varied anterior surface topography defining a ballast and having at least one contour that defines a substantially junctionless varying radial thickness of the contact lens, the varied anterior surface topography facilitating at least one of lens comfort, lens orientation, vertical lens translation, and lens stabilization when the contact lens is placed on a surface of a cornea of an eye, and the lens body being configured to correct or reduce a higher-order wavefront aberration of a patient's eye.

26. The contact lens of claim 25, wherein the lens body comprises a silicone hydrogel.

27. The contact lens of claim 25, wherein the hydrophilic silicone polymer component includes units from at least one monomer selected from a group consisting of silicon-containing monomers for polymerization into hydrophilic silicone polymers and mixtures thereof.

28. The contact lens of claim 27, wherein the at least one monomer is selected from the group consisting of siloxanes, silicon-containing acrylates, silicon-containing methacrylates, and mixtures thereof.

29. The contact lens of claim 25, wherein the lens body includes a substantially smooth, junctionless three dimensional asymmetrical posterior surface.

30. The contact lens of claim 25, wherein the lens body includes a posterior surface structured to approximate a curvature of a corneal surface when the lens body is placed on a surface of a cornea of an eye.

31. The contact lens of claim 30, wherein the posterior surface is structured to maintain a substantially uniform distance between the posterior surface of the lens body and a corneal surface when the lens body is placed on a surface of a cornea of an eye.

32. The contact lens of claim 25, wherein the lens body includes a bifocal optical zone.

33. The contact lens of claim 25 which is a silicone hydrogel lens structured for comfortable use in an eye for at least about 1 week without being removed.

34. The contact lens of claim 25 which is swelled with water.

* * * * *

Disclaimer and Dedication 7,828,431 B2—Arthur Ho, Clovelly NSW (AU); Arthur Back, Danville, CA (US). JUNCTIONLESS OPHTHALMIC LENSES AND METHODS FOR MAKING SAME. Patent dated November 9, 2010. Disclaimer filed January 12, 2012, by the assignee, Coopervision International Holding Company, LP.

Hereby disclaims and dedicates to the public, all claims 1-34 of said patent.

*(Official Gazette, February 14, 2012)*